March 14, 1939. G. OZER 2,150,560
WATCH CLEANING MACHINE
Filed Dec. 16, 1936
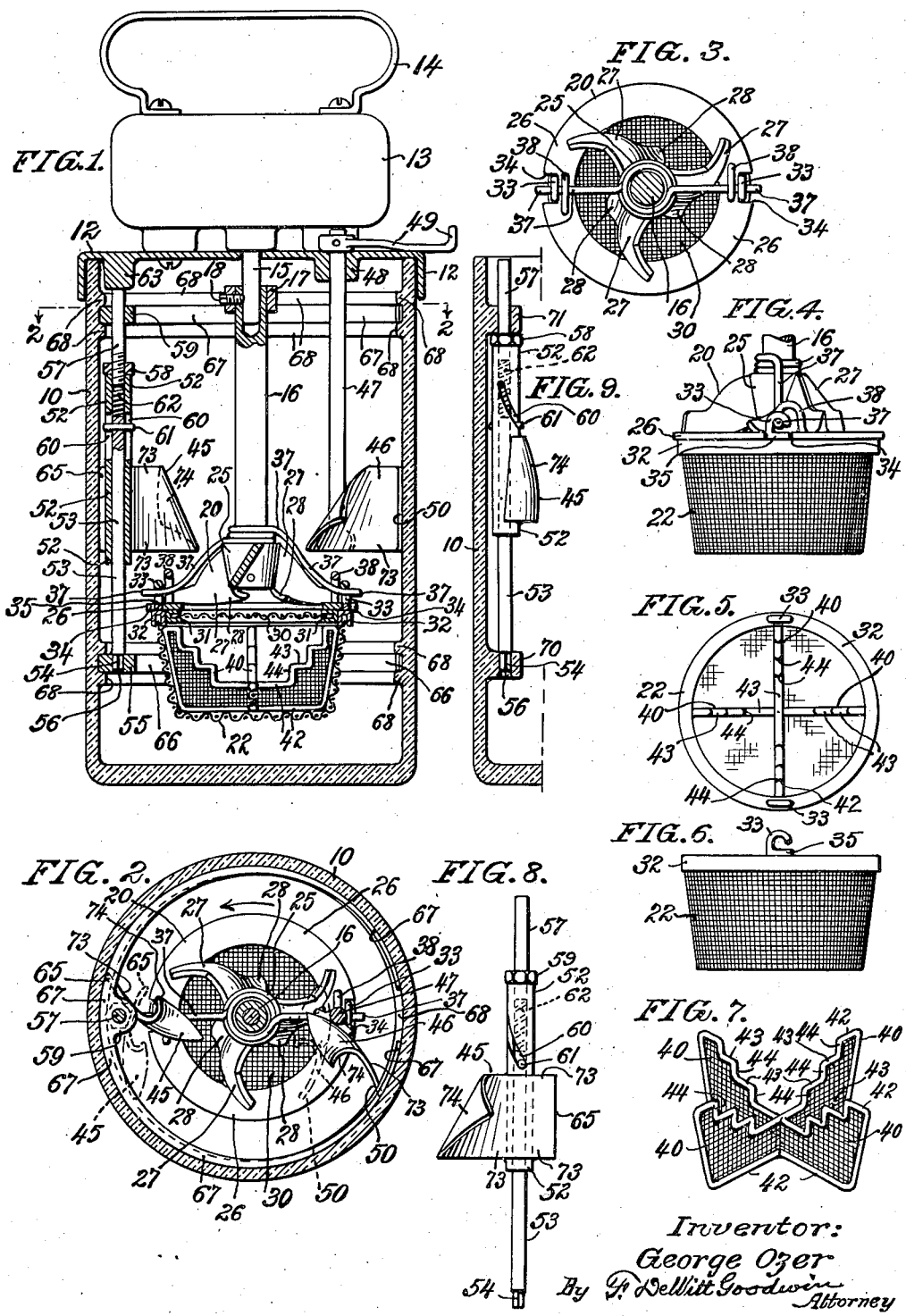
Inventor:
George Ozer
By F. DeWitt Goodwin
Attorney Patented Mar. 14, 1939

2,150,560

UNITED STATES PATENT OFFICE 2,150,560

WATCH CLEANING MACHINE

George Ozer, Chester, Pa.

Application December 16, 1936, Serial No. 116,103

7 Claims. (Cl. 141—1)

My invention relates to watch cleaning machines and particularly to machines for cleaning watch or clock movements, by rapidly rotating a basket containing the parts to be cleaned, within a jar containing a cleaning liquid or solution, and then rinsing them in another jar containing the rinsing liquid.

The object of my invention is to provide novel deflectors within the jar for directing the liquid into the center of the basket and for preventing the liquid from splashing upon the cover and the upper portion of the machine, thereby preventing the liquids from being mixed when the cover and basket are changed from one jar to another. The novel arrangement of the deflectors within the jar permits the basket to be lifted above the deflectors and rotated to discharge the liquid from the basket and its contents before the basket is entirely removed from the jar.

A further object is to provide means for rotatably mounting the deflectors so that they may be positioned for readily inserting and removing the basket, and for rotating the deflectors until one edge thereof impinges against the inner surface of the jar for properly directing the liquid as it is whirled by the rotation of the basket.

A further object is to provide means actuated by the placing of the cover upon the jar for automatically rotating the deflector against the inner surface of the jar and for turning the deflector by the removal of the cover to permit the basket to be removed from the jar.

A further object is to construct the head which carries the basket in the form of an inverted truncated cone so that the head will direct the liquid toward the center of the basket.

A further object is to provide novel means for locking the basket upon the head, so that the basket may be locked and unlocked with one hand, thereby leaving the other hand free for lifting the cover and the basket from the jar and holding the same while locking and unlocking the basket.

These together with various other novel features of construction and arrangement of the parts, which will be more fully hereinafter described and claimed, constitute my invention.

Referring to the accompanying drawing, Fig. 1 is a central vertical sectional view showing my novel watch cleaning machine. Fig. 2 is a horizontal section on line 2—2 of Fig. 1. Fig. 3 is a plan view of the head and basket. Fig. 4 is a side elevation of Fig. 3. Fig. 5 is a plan view of the basket detached and showing the partitions. Fig. 6 is a side elevation of the basket. Fig. 7 is a perspective of the partitions removed from the basket. Fig. 8 is a side view in elevation of the automatically rotatable deflector, detached. Fig. 9 is a partial vertical section of the jar and showing a different form of bearings for the deflector.

In the drawing, in which like reference characters refer to like parts, 10 is the jar for containing a cleaning or rinsing liquid. A cover 12 is removably supported upon the jar. An electric motor 13 provided with a handle 14, is secured upon the cover 12, with the motor shaft 15 extending freely through the cover. An extension shaft 16 is detachably and adjustably secured to the shaft 15 by a sleeve 17 and a set-screw 18.

A head 20 is rigidly secured upon the lower end of the shaft 16 and carries the basket 22 for containing the watch parts to be cleaned. The head 20 comprises a hub 25 and a ring 26. The hub 20 is secured to the shaft 16, and blades or spokes 27 connect the hub and the ring. The hub 25 is in the shape of an inverted truncated cone. The hub is elevated above the plane of the ring 26 for insuring the free passage of the liquid downwardly through the ring and into the center of the basket. The inverted conical surface of the hub 25 reduces the obstruction to the downward flow of the liquid around the hub and directs the flow toward the center of the basket.

The blades 27 are spirally curved for drawing the liquid toward the axis of the head 20. Each blade is also provided with a downwardly and rearwardly curved extension 28 adapted for forcing the liquid through the ring 26 and into the basket when the head is rotated in the direction of the arrow.

The ring 26 forms the lid for the basket. The central opening of the ring is occupied by a wire mesh screening 30, having its edges secured in a ring 31 rigidly secured to the under side of the ring 26. Said ring 31 also provides a flange which enters the basket and properly centers the latter upon the ring 26.

The basket 22 comprises a top ring 32, to which is secured the body of the basket, which latter is formed of wire screening. Secured to the diametrically opposite portions of the ring 32 are hooks 33—33 projecting upwardly and adapted to enter recesses 34—34, formed in the periphery of the ring 26. Each hook 33 is provided with a horizontal member 35, which is secured to the top surface of the ring 32. The member 35 enters the recess 34 and forms a key adapted to fill said recess 34, for rotating the basket with the ring 26.

The basket is detachably secured upon the lower surface of the ring 26 by locking bars 37—37, formed of spring metal. The bars are secured upon the shaft 16 above the hub 25, and said bars are held adjacent to the ring 26 by loops 38—38, secured upon diametrically opposite portions of the ring. As shown in Figs. 3 and 4 the loops 38 are positioned out of radial alignment with the center of the hooks 33—33, so that when the basket is placed upon the ring 26, with the hooks extending into the recesses 34, the loops 38—38 will position the bars 37 immediately above the openings of the hooks and when the bars are depressed by the fingers they will be guided toward the open sides of the hooks and the bars will readily enter the latter.

The basket 22 is divided into compartments by vertical partitions 40—40, comprising frames 42 having wire screening secured between the frame members. The upper portions of the frames 42, forming said partitions, are arranged in step formation, with corresponding horizontal supporting members 43 for holding a main plate of a watch in a horizontal position, and vertical members 44 adapted for receiving a watch plate of any diameter and for centering said plate within the basket and thereby avoiding any vibration of the basket due to the unbalancing of the load. The step formation of the partitions supports the main watch plate so that the weight of the plate will not rest upon the smaller watch parts which are placed upon the bottom of the basket and distributed throughout the compartments formed by the radial partitions. Said partitions may be permanently secured within the basket.

The deflectors 45 and 46 for controlling the flow of liquid within the jar are constructed so as to extend over the basket and toward the axis thereof for directing the liquid into the basket. It has been found that the deflectors must have one edge thereof in contact with the inner surface of the jar to prevent the liquid from being driven up the side of the jar and splashing upon the lid. To accomplish this result it is necessary to mount the deflectors so that they can be rotated into a position which will permit the basket to be placed into and removed from the jar.

The deflector 46 is secured upon a shaft 47, rotatably mounted in a bearing 48 secured upon the cover 12. The shaft 47 extends above the cover and has a handle 49 secured thereon and adapted for rotating the deflector 46 into a position with one edge 50 thereof tightly pressed against the surface of the jar for directing the whirling liquid from the wall toward the center of the jar and the axis of the basket. When it is desired to remove the basket the handle 49 is rotated to move the deflector into the position shown in dot and dash lines in Fig. 2, with the deflector edge 50 free from the wall of the jar so that the deflector may be readily moved into and out of the jar when the cover 12 and the basket are moved relatively to the jar.

The deflector 45 is mounted within the jar and means are provided for rotating it automatically by the action of the cover 12. The deflector 45 is secured upon a sleeve 52 which latter is movable vertically upon a standard 53, having an end 54, adapted to be supported upon a bearing 55 having a recess 56 arranged for preventing the standard 53 from rotating.

The upper end of the sleeve 52 is adjustably attached to a rod 57 which is threaded into the upper end of the sleeve and held in an adjusted position upon the sleeve by a lock nut 58. The rod 57 is freely rotatable in a bearing 59, located upon the wall of the jar. The sleeve 52 is provided with helical slots 60—60 through which extend the opposite ends of a projection or pin 61, secured in the upper end of the standard 53. A coiled spring 62 is located within the sleeve 52 between the standard 53 and the rod 57 and tends to lift the sleeve relatively to the standard so that the pin 61 will cause the sleeve to rotate and move the deflector 45 into the position shown in dot and dash lines Fig. 2, so that the basket can be moved into and out of the jar without touching the deflector 45. The cover 12 is provided with a boss 63 which engages the upper end of the rod 57 and depresses it when the cover is placed upon the jar. The rod 57 in turn depresses the sleeve 52 against the action of the spring. The downward movement of the sleeve 52, relatively to the pin 61 on the standard, causes the sleeve to rotate, due to the walls of the sleeve forming the slots 60—60 engaging the pin 61, thus rotating the sleeve 52 into a position in which the deflector 45 will have its edge 65 in contact with the jar and its opposite edge projecting over the basket.

The bearings 55 and 59 are shown in Figs. 1 and 2 mounted upon split rings 66 and 67, which rings are detachably secured to the jar by occupying recesses formed between annular ribs 68—68 formed upon the jar.

Bearings 70 and 71, shown in Fig. 9, for mounting the deflector 45, may be formed as integral portions of the jar.

The deflector 45 may be readily removed from the jar by compressing the spring 62, lifting the standard 53 from the lower bearing 55, or 70, and then lowering the standard until the rod 57 is free from the upper bearing 59, or 71.

The deflector 45 comprises a plate having a cylindrically curved portion 73 formed about a vertical axis extending parallel with the sleeve 52 and also with the vertical edge 65 of the plate, so that said edge will impinge upon the cylindrical surface of the jar. Said plate is also provided with a curved portion 74 having an axis extending obliquely to the vertical axis of the cylindrical portion 73. The deflector 46 is constructed in the same form as the deflector 45.

The operation of the machine is as follows: The motor and parts associated with the cover are supported by the handle 14, which is grasped in one hand and the basket, with the watch parts therein, is locked upon the head 20 by engaging the bars 37 with the hooks 33, which may be readily operated by the other hand. The basket is inserted in a jar containing a cleaning liquid and the cover is adjusted upon the jar. The handle 49 is turned to engage the vertical edge of the deflector 46 with the wall of the jar. The deflector 45 is automatically rotated to engage the wall of the jar by the action of the cover depressing the rod 57. The motor is operated for rotating the basket in the liquid, which latter is forced upwardly upon the wall of the jar until it is directed by the deflectors toward the center of the jar and into the center of the basket. By thus directing the course of the liquid only a small quantity of liquid sufficient to cover the basket is required.

When the cleaning operation is completed the handle 49 is turned to withdraw the deflector 46 from the wall of the jar. The cover is lifted and the deflector 45 is automatically turned so that the basket may be removed. When the basket is raised above the level of the liquid and above the deflectors, the motor is operated for rotating the basket sufficiently to throw the liquid off the basket and its contents before the basket is entirely removed from the jar. The cover and parts associated therewith are then placed upon another jar containing a rinsing liquid. By my novel construction of the deflectors the liquid is prevented from being thrown upon the cover and the upper parts of the machine, thus preventing any of the cleaning liquid being mixed with the rinsing liquid, which would cause the watch parts to rust.

Various changes in the construction and operation of the parts may be made without departing from my invention.

I claim:

1. In a watch cleaning machine the combination of a jar for containing liquid, a basket mounted for rotation within the jar, a double edged deflector within the jar and rotatable about a vertical axis with its edge portions extending in opposite directions from said axis, and means for rotating said deflector for moving one edge portion of the latter into and out of contact with the inner surface of the jar and simultaneously moving its other edge portion to and from a position adjacent the basket.

2. In a watch cleaning machine the combination of a jar for containing liquid, a cover upon the jar, a shaft mounted for rotation and depending into the jar, a basket upon the lower end of the shaft, a deflector adapted for directing the flow of liquid within the jar, means rotatably mounting the deflector within the jar, and means operatively associated with the deflector and actuated by the cover when placed upon the jar adapted for positioning the deflector with one edge portion thereof extending toward the inner surface of the jar and its opposite edge portion extending toward the center of the basket.

3. In a watch cleaning machine the combination of a jar for containing liquid, a cover upon the jar, a shaft mounted for rotation and depending into the jar, a basket upon the lower end of the shaft, a standard mounted within the jar, a deflector movably mounted upon the standard and adapted for directing the flow of liquid within the jar, a spring associated with the deflector and with said standard and tending to rotate the deflector in one direction, and means operatively associated with the deflector and actuated by the cover when placed upon the jar to rotate the deflector in the opposite direction against the action of the spring and into a position with one edge portion of the deflector extending toward the inner surface of the jar and its opposite portion extending toward the center of the basket.

4. In a watch cleaning machine the combination of a jar for containing liquid, a cover upon the jar, a shaft mounted for rotation and depending into the jar, a basket upon the lower end of the shaft, a deflector adapted for directing the flow of liquid within the jar, a sleeve upon which the deflector is secured, a standard upon which the sleeve is slidably mounted, a spring tending to move the sleeve upon the standard and against the cover, a bearing upon the jar in which the sleeve is rotatably mounted upon a vertical axis, a bearing upon the jar adapted for holding the standard against rotation, said sleeve having a helical slot formed therein, and a projection upon the standard occupying said slot and adapted for rotating the sleeve when the latter is depressed by the cover thereby rotating the deflector toward the inner surface of the jar.

5. In a watch cleaning machine the combination of a jar for containing liquid, a cover upon the jar, a shaft mounted for rotation and depending into the jar, a basket secured upon said shaft, a deflector located within the jar, bearings upon which the deflector is mounted for rotation upon a vertical axis, rings upon which said bearings are mounted, and means upon the jar adapted for supporting said rings.

6. In a watch cleaning machine the combination of a jar for containing liquid, a cover upon the jar, a shaft mounted for rotation and depending into the jar, a basket secured upon said shaft, a deflector, bearings located within the jar, means mounting the deflector upon said bearings, said means adapted for engagement with the cover and actuated by the latter when placed upon the jar for rotating the deflector into a position for directing the liquid toward the center of the basket, a second deflector, a rod upon which the second deflector is secured, a bearing upon the cover in which said rod is rotatably mounted, and a handle upon the rod above the cover and adapted for rotating the second deflector into a position for directing the liquid toward the center of the basket.

7. In a watch cleaning machine the combination of a jar for containing liquid, a shaft mounted for rotation and depending into the jar, a truncated conical hub secured upon the lower end of the shaft, a ring located in spaced relation to and below said hub, downwardly extending spokes connecting the hub with the ring, a basket detachably secured to the under side of the ring, and said hub arranged with its smaller end presented toward the center of the ring for increasing the size of the passage for the liquid surrounding the hub leading through the ring into the center of the basket.

GEORGE OZER.